United States Patent [19]

Husain

[11] 4,186,787
[45] Feb. 5, 1980

[54] FLOATING ANCHOR NUT ASSEMBLY AND BASKET MEMBER COMPONENT

[75] Inventor: Ahmed Husain, Union, N.J.

[73] Assignee: Amerace Corporation, New York, N.Y.

[21] Appl. No.: 865,028

[22] Filed: Dec. 28, 1977

[51] Int. Cl.² ............................................. F16B 37/00
[52] U.S. Cl. .................................................. 151/41.73
[58] Field of Search ..................... 85/32 K; 151/41.73, 151/41.74, 41.76

[56] References Cited
U.S. PATENT DOCUMENTS

| | | | |
|---|---|---|---|
| 2,243,923 | 6/1941 | Swanstrom | 151/41.76 |
| 3,174,523 | 3/1965 | Hult | 151/41.74 X |
| 3,556,570 | 1/1971 | Cosenza | 151/41.76 X |
| 3,640,327 | 2/1972 | Burt | 151/41.74 |
| 3,695,324 | 10/1972 | Gulistan | 151/41.76 X |
| 3,698,278 | 10/1972 | Trembley | 151/41.73 X |

*Primary Examiner*—William H. Schultz
*Attorney, Agent, or Firm*—Richard A. Craig

[57] ABSTRACT

Disclosed herein is a rivetless floating anchor nut assembly comprising a nut member having opposed lugs and a onepiece metal basket member which has a sleeve portion and a nut member engaging and retaining portion. The sleeve portion is adapted to be permanently deformed in an aperture in a workpiece to affix the basket member to the workpiece and the nut member engaging and retaining portion has a pair of wings each having slots therethrough in which the nut lugs are captured. The wings are resiliently flexible to permit removal and replacement of the nut member an indefinite number of times. The basket member has a hardness in the range between 34 and 38 on the Rockwell C scale.

Also disclosed herein is a flaring tool useful in deforming the sleeve portion to affix the basket member and hence the assembly to the workpiece. The tool comprises an upper face and a flaring portion projecting from the upper face. The flaring portion includes a cylindrical element remote from the upper face and a frusto-conical element joining the cylindrical element and the upper face.

20 Claims, 4 Drawing Figures

FLOATING ANCHOR NUT ASSEMBLY AND BASKET MEMBER COMPONENT

BACKGROUND OF THE INVENTION

The present invention relates to a rivetless floating anchor nut assembly including a nut member and a basket member, to the basket member per se and to a flaring tool for use in affixing the basket member and hence the anchor nut assembly to a workpiece.

Floating anchor nut assemblies have been known and used for many years, each such assembly including a nut member and a basket member affixable to a workpiece by rivets passing through mounting holes in the basket member and the workpiece. An example of such a prior art assembly is found in Swanstrom U.S. Pat. No. 2,243,923, granted June 3, 1941. Floating anchor nuts of which that of said Swanstrom patent provides an example are subject to the limitation that edge mounting distances are limited. Furthermore, the rivet holes may provide areas of stress concentration giving rise to fatigue failure. It is therefore desirable to provide a floating anchor nut assembly which does not entail the use of rivets.

It is also desirable for many floating anchor nut applications, that the nut member be replaceable an indefinite number of times.

Gulistan U.S. Pat. No. 3,695,324, granted Oct. 3, 1972, discloses a rivetless floating anchor nut assembly including a nut member which is replaceable an indefinite number of times. As brought out in more detail hereinafter, the device of the Gulistan patent entails a three-piece assembly, including, in addition to the nut member, a basket member of springy or resilient material and an attaching sleeve of malleable material. The Gulistan patent specifically teaches that the resiliency of the basket member and the malleability of the attaching sleeve cannot be combined in a single piece, where nut member replaceability is desired.

It has been found, unexpectedly and unobviously, that the resiliency of the basket member and the malleability of the attaching sleeve of the Gulistan patent can be combined in one piece, namely, a basket member, if the basket member has a hardness in the range of which the lower limit is 34 on the Rockwell C scale and the upper limit is 38 on the Rockwell C Scale, thus eliminating the need for the attaching sleeve of the Gulistan patent as a piece separate from the basket member. Preferably, the basket member is of heat treatable metal, heat treated to have a hardness within said range. Still more preferably, the basket member is heat treated to uniform hardness in said range. The direct cost saving which is made possible by eliminating the attaching sleeve from the three-piece assembly of the Gulistan patent is a significant advantage of the present invention.

It is therefore an important object of the present invention to provide a rivetless floating anchor nut assembly which has fewer pieces and is thus less costly than the assembly of the Gulistan patent. More particularly, it is an important object to provide a rivetless floating anchor nut assembly which includes a nut member and a basket member wherein the basket member is at the same time sufficiently resilient to enable the nut member to be replaced an indefinite number of times and sufficiently malleable to enable the basket member to be permanently deformed so as to affix the basket member and hence the assembly to a workpiece.

It is a further object to provide a novel and unobvious basket member for use as a component of a rivetless floating anchor nut assembly.

In addition to the direct cost reduction realized by the floating anchor nut assembly of the present invention with respect to the floating anchor nut assembly of the Gulistan patent, a floating anchor nut assembly in accordance with the present invention is considerably lighter in weight than that of the Gulistan patent.

Furthermore, in the anchor nut assembly of the Gulistan patent, the attaching sleeve has a flange of substantial axial thickness at one end, which flange is interposed between confronting surfaces of the basket member and the nut member. The flange of the attaching sleeve contributes to the overall axial extent of the assembly. The present invention, by combining the functions of the basket member and the attaching sleeve of the Gulistan patent in a single basket member, eliminates from the overall axial extent of the assembly the thickness of the flange of the attaching sleeve of the Gulistan patent and enables the use of shorter, lighter and less costly bolts. The saving in bolt weight is likely to be much more significant than the saving in weight of the floating anchor nut assembly per se.

Therefore, further objects of the invention are to provide a floating anchor nut assembly which is substantially lighter in weight than that of the Gulistan patent, to provide a floating anchor nut assembly which is of reduced dimensions with respect to that of the Gulistan patent and to provide floating anchor nut assembly requiring shorter and hence less costly and lighter bolts than are required with the floating anchor nut assembly of the Gulistan patent.

SUMMARY OF THE INVENTION

The present invention, in one of its aspects, is a rivetless floating anchor nut assembly including a nut member and a basket member, wherein the nut member includes a central sleeve portion having an internal thread and a base portion providing the nut member with a bearing surface and a pair of identical diametrically opposed lugs. The basket member is of one-piece construction and is of heat treatable metal and may be fabricated of sheet metal. The basket member has a sleeve portion of predetermined internal diameter and a nut member engaging and retaining portion. The basket member is heat treated to a hardness in the range of which the lower limit is 34 on the Rockwell C scale and the upper limit is 38 on the Rockwell C scale.

The sleeve portion of the basket member is adapted to enter an aperture in a workpiece and has a part adapted to be permanently deformed therein to affix the basket member to the workpiece. The nut member engaging and retaining portion has wings with slots therethrough, which wings are capable of resilient flexure to permit installation and removal of the nut member, the lugs of which are adapted to enter the slots.

The workpiece has an aperture therethrough, the aperture including a cylindrical portion joining a first surface of the workpiece and a coutersunk portion coaxial with the cylindrical portion and joining the second surface of the workpiece in a circle of juncture of predetermined diameter.

The inventive flaring tool, which may be of tool steel, having a hardness in the range of which the lower limit is 55 on the Rockwell C scale and the upper limit is 60 on the Rockwell C scale, is preferably of one-piece construction. The flaring tool has a plane upper face of greater transverse dimensions than the diameter of the circle of juncture of the countersunk portion of the workpiece aperture and the second workpiece surface. The flaring tool further has a flaring portion projecting from its plane upper face and including a cylindrical element remote from the upper face and a frusto-conical element joining the cylindrical element and the upper face and having its largest diameter at its circle of juncture with the upper face. The cylindrical and frusto-conical elements are coaxial with each other and the axis thereof is perpendicular to the upper face. The cylindrical and frusto-conical elements join each other in a circle of juncture which is parallel to the upper face and the conical angle of the frusto-conical element is preferably the same as that of the countersunk portion of the workpiece aperture.

Further structural details and the functioning of the flaring tool are described hereinafter.

The invention is well adapted to the attainment of the foregoing objects and advantages and additional objects and advantages which will appear hereinafter.

DESCRIPTION OF THE INVENTION

Figure 1:
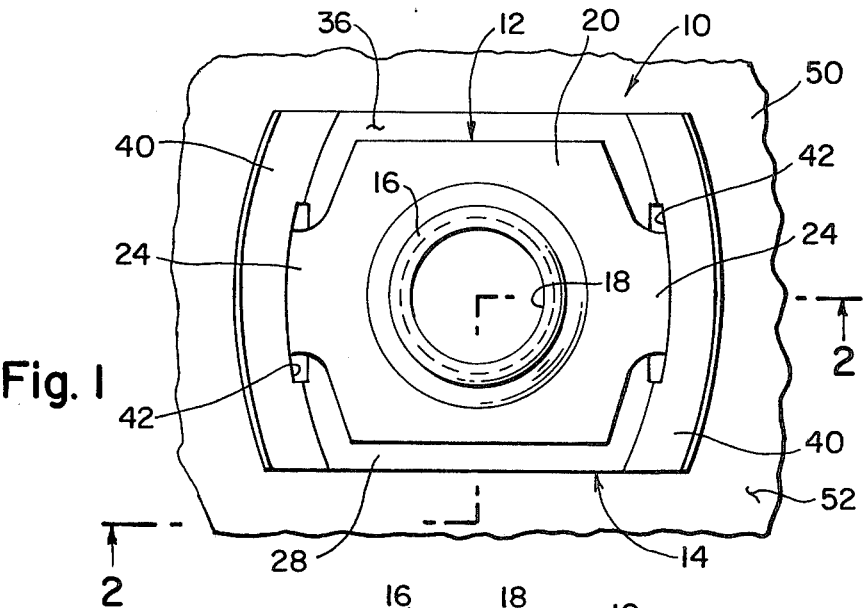
FIG. 1 is a plan view of a preferred form of two-piece rivetless floating anchor nut assembly with replaceable nut member according to the invention, also showing a workpiece such as a sheet or a panel to which the nut assembly is to be affixed.

The drawing shows a two-piece rivetless floating anchor nut assembly 10 comprising a nut member 12 and a basket member 14.

Nut member 12 includes a central sleeve portion 16 having an internal thread 18 of predetermined thread size and defining a nut member axis. Merging with one end of sleeve portion 16 is a base portion 20 lying at right angles to the nut member axis and providing nut member 12 with a plane bearing surface 22 perpendicular to the nut member axis and facing away from sleeve portion 16. Nut member base portion 20 is configured to provide nut member 12 with a pair of identical diametrically opposed lugs 24 of predetermined width, length and axial thickness.

Nut member 12 may be of heat treatable material, of which C-1035 steel is a suitable example, and may be rendered selflocking by elliptically deforming sleeve portion 16 at the axial end thereof remote from base portion 20 and then heat treating nut member 12 to develop required hardness, resiliency and strength, all in known fashion. For simplicity, no deformation of sleeve portion 16 is shown.

Basket member 14 is of one-piece metal construction and has a hardness in the range of which the lower limit is 34 on the Rockwell C scale and the upper limit is 38 on the Rockwell C scale. Preferably, basket member 14 is of heat treatable metal, a suitable example of which is C-1035 steel, heat treated to have a hardness within said range. Still more preferably, basket member 14 is heat treated to a uniform hardness in said range.

Basket member 14, which may be formed of sheet stock and heat treated after forming, has a sleeve portion 26, and merging with one end of sleeve portion 26, a nut member engaging and retaining portion 28. Sleeve portion 26 has an internal cylindrical surface 30 defining a basket member axis and having a diameter larger than the major diameter of thread 18. Sleeve portion 26 of basket member 14 has, at the end thereof remote from portion 28, a plane annular surface 32 perpendicular to the basket member axis and extending radially outwardly from cylindrical surface 30. Sleeve portion 26 further has an external cylindrical surface 34 coaxial with internal cylindrical surface 30 and extending forward retaining portion 28 from surface 32 to an axial location between surface 32 and retaining portion 28. Surfaces 30 and 34 cooperate to provide sleeve portion 26 with a permanently deformable, relatively thin annular wall part.

Nut member engaging and retaining portion 28 of basket member 14 has a plane bearing surface 36 surrounding and perpendicular to the basket member axis and extending radially outwardly from the end of cylindrical surface 30 remote from surface 32, and confronting and in slidable engagement with nut member bearing surface 22. Surface 36 is generally similar in shape to, but larger than surface 22. More particularly, surface 36, as viewed in FIG. 1, has like parallel straight sides and like arcuate ends.

Retaining portion 28 also has a plane workpiece engaging surface 38 surrounding and perpendicular to the basket member axis and facing in the direction opposite that faced by surface 36.

Figure 2:
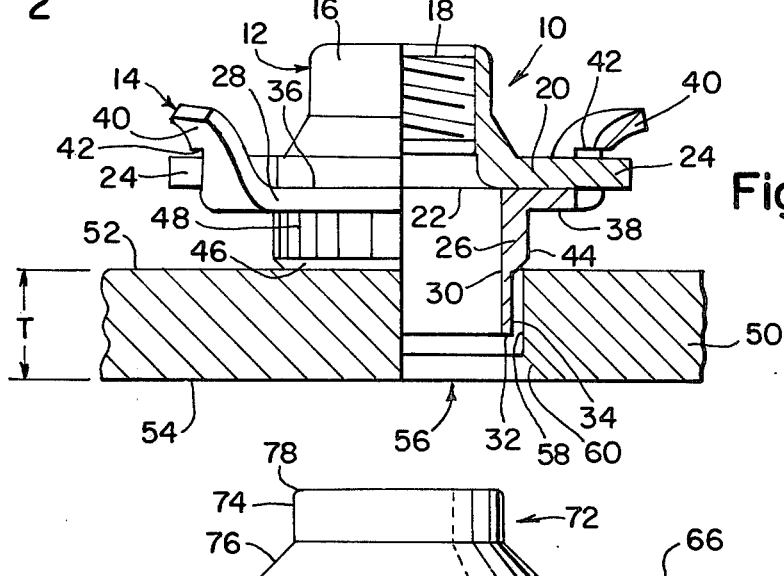
FIG. 2 is a view on line 2—2 of FIG. 1, showing the nut assembly in position to be affixed to the sheet.

Retaining portion 28 further has a pair of identical diametrically opposed wings 40 which are bent from the plane of surface 36 at the arcuate ends thereof in the direction away from surface 32. As seen in FIG. 2, each wing 40 in the vicinity of its free end, i.e., the end remote from surface 36, is flared outwardly away from the basket member axis. One surface of each wing 40 merges with surface 36 and the other surface of each wing 40 merges with surface 38. Each wing 40 extends the entire width of surface 36 and, as seen in FIG. 1, is substantially arcuate in shape, having a first radius of curvature which is the same as the radius of curvature of the arcuate ends of surface 36, and a second radius of curvature at its free end. For each wing 40, the centers of curvature of the first and second radii of curvature coincide and are on the opposite side the basket member axis from that wing 40, so that wings 40 are concave with respect to the basket member axis. Furthermore, wings 40 have substantially cylindrical confronting parts axially adjacent surface 36 and coaxial with the basket member axis. Each wing 40 is provided with a slot 42 therethrough adjacent surface 36, slots 42 being identical and diametrically opposed. The length of each slot 42, as shown in FIG. 1, is greater than the width of each nut member lug 24 and slots 42 are spaced from each other a distance less than the distance between the opposed ends of lugs 24 but greater than the diameter of sleeve portion 16 axially adjacent base portion 20. The height of each slot 42 is greater than the axial thickness of each lug 24. Each slot 42 also extends, at its bottom, axially from surface 36 to surface 38. Thus, nut member 12 is permitted limited movement in directions perpendicular to the basket member axis and gives nut assembly 10 its "floating" feature.

To revert to sleeve portion 26, it also has an external cylindrical surface 44 coaxial with the basket member axis and extending from surface 38 toward surface 34 and of larger diameter than surface 34. The axial end of surface 44 remote from surface 38 is located farther from surface 32 than is the axial end of surface 34 remote from surface 32 and surfaces 34 and 44 are joined by a frusto-conical surface 46, coaxial with the basket member axis. Surface 44 is provided with axially extending knurls 48 throughout the circumferential extent thereof. Surfaces 30 and 44 cooperate to provide sleeve portion 26 with a rigid, relatively thick annular wall part.

Nut member 12 and basket member 14 are assembled by inserting one nut member lug 24 in a slot 42 as far as possible and engaging the outer nut member lug 24 with the opposite wing 40 and squeezing the parts together, thus causing the last-mentioned wing 40 to undergo resilient flexure toward the plane of surface 36 until such other nut member lug 24 snaps into its associated slot 42, whereupon the flexed wing 40 resiliently snaps back to its original unflexed position, thus capturing nut member 12 with lugs 24 in slots 42 and with nut member bearing surface 22 confronting and in slidable engagement with basket member bearing surface 36, and completing assembly 10.

The manner of affixing nut assembly 10 to a workpiece will now be described. The workpiece may be a panel or sheet 50 of aluminum or other soft metal, sheet 50 having a given thickness T equal to the distance between surface 38 and plane perpendicular to the basket member axis and intermediate the axial ends of surface 34. Sheet 50 has opposed parallel surfaces 52 and 54 and an aperture 56 joining and perpendicular to surfaces 52 and 54. Aperture 56 has a cylindrical portion 58 extending from surface 52 toward surface 54 and a countersunk portion 60 extending from surface surface 54 toward and joining and coaxial with cylindrical portion 58. The conical angle of countersunk portion 60 may be on the order of 100°.

Figure 3:
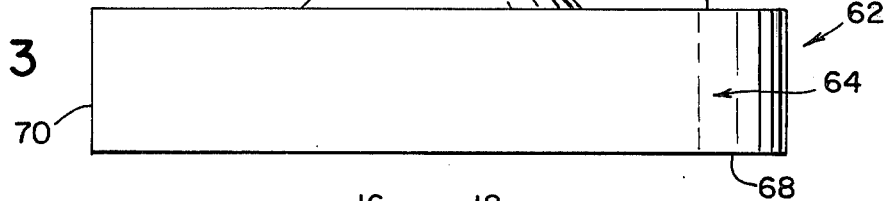
FIG. 3 is a side elevation of a flaring tool according to the invention for use in affixing the nut assembly to the sheet.

FIG. 3 shows a flaring tool 62 which may be used in affixing nut assembly 10 to sheet 50. Flaring tool 62 is of one-piece construction and is of tool steel, having a hardness of 55 to 60 on the Rockwell C scale.

Flaring tool 62 has a base portion 64 comprising upper and lower plane parallel faces 66 and 68, respectively, joined by a cylindrical surface 70 perpendicular to faces 66 and 68. The spacing between faces 66 and 68 is not critical and the diameter of surface 70 is not critical, as long as it is greater than the diameter the circle of juncture of frusto-conical portion 60 of aperture 56 and surface 54 of sheet 50. Surface 70 defines a flaring tool axis.

Flaring tool 62 further has a flaring portion 72 projecting from upper face 66 and comprising a cylindrical element 74 remote from face 66 and a frusto-conical element 76 adjacent face 66 and having its largest diameter at its circle of juncture with face 66. Cylindrical element 74 and frusto-conical element 76 are coaxial with each other and with surface 70 and join each other in a circle of juncture which is parallel to face 66. The common axis of elements 74 and 76 is perpendicular to face 66 and the conical angle of element 76 is preferably the same as that of countersunk portion 60 of aperture 56.

The diameter of the circle of juncture of frusto-conical element 76 and face 66 is intermediate the diameters of cylindrical portion 58 of aperture 56 and the circle of juncture of countersunk portion 60 and surface 54.

The diameter of cylindrical element 74 and the circle of juncture of elements 74 and 76 is just slightly less than the diameter of surface 30, so that element 74 can just barely fit freely within surface 30.

The axial end of cylindrical element 74 remote from upper face 66 may be slightly rounded as shown at 78.

The axial length of frusto-conical element 76 is slightly greater than the axial length of countersunk portion 60 of aperture 56 of sheet 50 and the axial length of cylindrical element 74 is somewhat greater than the axial length of frusto-conical element 76, but the combined axial length of elements 74 and 76 is somewhat less than thickness T of sheet 50, and, related to nut assembly 10, is somewhat greater than the axial length of surface 34 and somewhat less than the axial length of surface 30.

Nut assembly 10 is affixed to sheet 50, with the aid of flaring tool 62, by disposing tool 62 on the side of sheet 50 having surface 54, with cylindrical element 74 confronting aperture 56 and abutting face 66 against surface 54, so that cylindrical element 74 enters and lies generally within cylindrical portion 58 of aperture 56 and frusto-conical element 76 enters and lies generally within frusto-conical portion 60 of aperture 56. With tool 62 so disposed and nut assembly 10 disposed generally as shown in FIG. 2, nut assembly 10 is driven toward face 66 until workpiece engaging surface 38 engages surface 52. During this driving operation, knurls 48, which are on the relatively thick annular wall part of sleeve portion 26, broach their way into the wall of cylindrical portion 58 of aperture 56 thereafter to prevent basket member 14 from being rotated or twisted with respect to sheet 50, and frusto-conical element 76 permanently flares the relatively thin wall part of sleeve portion 26 outwardly into countersunk portion 60 of aperture 56, as indicated at 80 in FIG. 4, thereafter to prevent basket member 14 from being pushed out of sheet 50.

Figure 4:
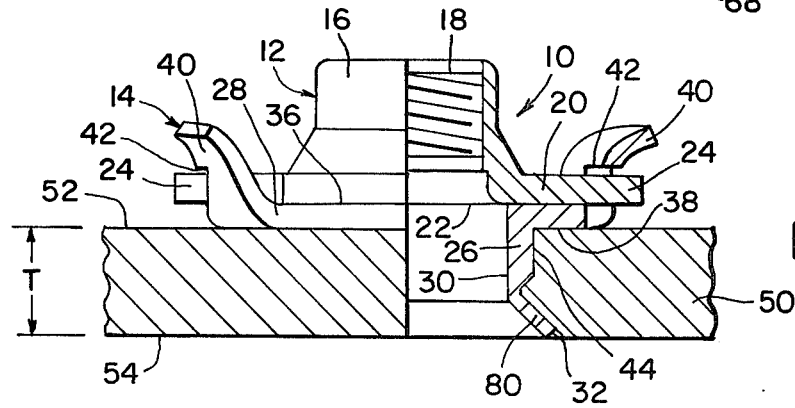
FIG. 4 is a view similar to FIG. 2 but showing the nut assembly affixed to the sheet.

This completes the affixing of nut assembly 10 to sheet 50. As shown in FIG. 4, basket member 14 does not protrude beyond surface 54 of sheet 50, being substantially flush therewith.

It is a requirement of a rivetless floating anchor nut assembly that it must be possible to replace the nut member as many as 15 to 20 times and that this be done without removing the basket member from the sheet. With reference to the inventive two-piece rivetless anchor nut assembly, replacement of a used nut member 12 with a new nut member 12 is accomplished by positioning used nut member 12 so that one lug 24 enters its associated slot 42 as far as it will go, resiliently flexing the opposite wing 40 toward the plane of surface 36 until the opposite lug 24 can just clear the slot 42 of the flexed wing 40 and lifting the used nut member 12 out of basket member 14. The flexed wing 40 will thereupon resiliently snap back to its original unflexed position and the new nut member 12 can be assembled with basket member 14 in the manner previously described.

The aforesaid Gulistan patent teaches the hereinabove described manner of installing a nut member with and removing it from a basket member.

The Gulistan patent entails a three-piece rivetless floating anchor nut assembly which includes a nut member, a basket member and an attaching sleeve. The basket member is of springy resilient sheet material, such as 1095 carbon steel having opposed slotted sidewalls through which tabs of the nut member project. By virtue of the resiliency of the basket member side walls, they may be deflected repeatedly to permit removal and replacement of the nut member. The attaching sleeve is of malleable material, such as 304 stainless steel, and includes a tubular portion at one end of which is a flange having tabs which extend through the sidewalls of the basket member. The tubular portion has a straight knurl which embeds itself into an opening in a workpiece and the end of the tubular portion remote from the attaching sleeve tabs is flared outwardly to provide an attaching flange to hold the bottom wall of the basket member against the upper surface of the workpiece while holding the floating anchor nut assembly and the workpiece together. Parts manufactured by the assignee of the Gulistan patent have been tested and it has been found that the hardness of the basket member is in the range from about 48 to 49 on the Rockwell C scale and that the hardness of the attaching sleeve, which is not uniform for any given sleeve, is in the range from about 35 to about 40 on the Rockwell C scale. A drawing of the assignee of the Gulistan patent specifies a hardness in the range 42 to 47 on the Rockwell C scale for the basket member and does not specify any hardness for the attaching sleeve.

The Gulistan patent also discloses in FIGS. 10 and 11 a two-piece floating anchor nut assembly, in which the basket member and the attaching sleeve are combined in a single receptacle member, including two slotted sidewalls and a tubular portion having a knurl and a thin-walled end part adapted to be flared outwardly to form a retaining flange. It is taught in the Gulistan patent that the receptacle member of FIGS. 10 and 11 must possess ductility to allow the tubular portion to be flared outwardly to form a retaining flange and that without this ductility, the flange could not be secured to the workpiece. It is further taught in the Gulistan patent that the sidewalls of the receptacle member of FIGS. 10 and 11 are also ductile rather than springy and that consequently there cannot be repeated nut member replacement in the case of the assembly of FIGS. 10 and 11 because fatigue failure will occur from repeatedly bending the sidewalls of the receptacle.

Thus, the Gulistan patent teaches that a rivetless floating anchor nut assembly must have three pieces in order to provide nut member replaceability an indefinite number of times, in order to take account of the conflicting requirements of ductility or malleability and resiliency, in other words, that the required ductility or malleability and resiliency cannot be attained in a single piece.

Surprisingly and unobviously, it has been discovered, contrary to the teachings of the Gulistan patent, that the conflicting requirements of ductility or malleability and resiliency can be combined in a single basket member 14 by heat treating the same into the hardness range between 34 and 38 on the Rockwell C scale. If the hardness is less than 34 on the Rockwell C scale, resiliency and nut member replaceability are lost. If the hardness is greater than 38 on the Rockwell C scale, malleability and basket member retainability in the workpiece aperture are lost.

Some typical pertinent dimensions are as follows for a satisfactory example of nut assembly 10 in which thread 18 is of the 0.1900-32UNJF-3B thread size, for use with sheet 50 having thickness T of 0.107 to 0.133 inch:

| For nut member 12 | |
|---|---|
| Distance between opposed end of lugs 24 | 0.545 inch |
| Width of lugs 24 | 0.125 inch |
| Axial thickness of lugs 24 | 0.032–0.040 inch |
| Diameter of external circle of juncture between sleeve portion 16 and base portion 20 | 0.266 inch |
| Width of base portion 20 | 0.340 inch |
| Length of base portion 20 along edges perpendicular to its width | 0.287 inch |
| Axial length of nut member 12 | 0.174 inch |

| For basket member 14 (in undeformed condition) | |
|---|---|
| Stock thickness | 0.025 inch |
| Diameter of surface 30 | 0.243 inch |
| Diameter of surface 34 | 0.267 inch |
| Diameter of surface 44 (after knurls 48 are formed) | 0.300 inch |
| Axial length of surface 44 | 0.053–0.060 inch |
| Axial distance from surface 32 to surface 38 | 0.130 inch |
| Conical angle of surface 46 | 90° |
| Knurls 48 | 25 per inch |
| Width of surface 36 (and basket member 14) | 0.390 inch |
| Length of each slot 42 | 0.187 inch |
| Distance between slots 42 at intersection with surface 36 | 0.386 inch |
| Axial height of slots 42 from surface 38 | 0.075 inch |
| Axial height of wings 42 from surface 38 | 0.150 inch |
| Distance between free ends of wings 40 (the overall length of basket member 14) | 0.572 inch |
| Radius of curvature of arcuate end of each surface 36 | 0.471 inch |
| Radius of curvature of each wing 40 at free end thereof | 0.552 inch |
| Diameter of cylindrical confronting parts of wings 40 axially adjacent surface 36 | 0.425 inch |

The maximum protrusion of the immediately foregoing example of nut assembly 10 from sheet surface 52, after said example has been affixed to sheet 50, is only about 0.205 inch, whereas such protrusion for a comparable assembly of the Gulistan patent is about 0.235 inch.

Typical pertinent dimensions are as follows for a satisfactory example of flaring tool 62 for use in affixing the immediately foregoing example of nut assembly 10 to sheet 50 of thickness T of 0.107 to 0.133 inch, in which the diameter of cylindrical portion 58 of aperture 56 is 0.281 inch, the diameter of the circle of juncture of countersunk portion 60 of aperture 56 and surface 54 is 0.370 inch and the conical angle of countersunk portion 60 is 100°:

| For flaring tool 62 | |
|---|---|
| Diameter of cylindrical element 74 | 0.240 inch |
| Diameter of circle of juncture of frusto-conical element 76 and face 66 | 0.322 inch |
| Conical angle of frusto-conical element 76 | 100° |
| Axial length of cylindrical element 74 | 0.060 inch |
| Axial length of frusto-conical element 76 | 0.040 inch |

The design of flaring tool 62 contributes substantially to the successful performance of nut assembly 10.

A device of the kind disclosed herein is sometimes called a "two-piece" floating anchor nut assembly. This does not preclude the inclusion of a third piece, but means only that the functions of nut member replaceability and retention of the assembly to the sheet are combined in a single basket member. Thus, for example, the nut member of the assembly could be provided with a locking collar without departing from the invention.

The foregoing details are given by way of example only, except as those details are included in the appended claims.

The embodiments of the invention in which an exclusive property or privilege is claimed are as follows:

1. A basket member for use as a component of a rivetless floating anchor nut assembly, said basket member being of one-piece metal construction and having a sleeve portion and a nut member engaging and retaining portion, said sleeve portion adapted to enter an aperture in a workpiece and having a deformable part adapted to be permanently deformed to affix said basket member to said workpiece and said nut member engaging and retaining portion having a bearing surface adapted for slidable engagement with a bearing surface of said nut member and a pair of wings each having a slot therethrough adjacent said basket member bearing surface, said slots adapted to receive nut member lugs releasably to capture the nut member, said wings being resiliently flexible to permit assembly and disassembly of a nut member with and from said basket member an indefinite number of times, said basket member having a hardness in the range of which the lower limit is 34 on the Rockwell C scale and the upper limit is 38 on the Rockwell C scale.

2. The basket member of claim 1 wherein the basket member is of heat treatable metal and is heat treated to a hardness in said range.

3. The basket member of claim 2 wherein said basket member is heat treated to a uniform hardness in said range.

4. The basket member of claim 2 wherein said metal is C-1035 steel.

5. The basket member of claim 2 wherein said sleeve portion has an internal cylindrical surface defining a basket member axis and intersecting the bearing surface of said basket member, a first external cylindrical surface coaxial with said internal cylindrical surface and cooperating with said internal surface to provide said sleeve portion with a relatively thin annular wall part axially spaced from the bearing surface of said basket member, a second external cylindrical surface coaxial with said internal surface and of larger diameter than said first external cylindrical surface and cooperating with said internal surface to provide said sleeve portion with a relatively thick annular wall part axially between the first external cylindrical surface and the bearing surface of said basket member, said relatively thin annular wall part providing said deformable part of said basket member.

6. The basket member of claim 5 wherein said thin annular wall part is imperforate.

7. The basket member of claim 5 wherein said first and second external cylindrical surfaces are joined by a frusto-conical surface intermediate the axial ends of the sleeve portion.

8. The basket member of claim 5 wherein said second external cylindrical surface is provided with axially extending knurls adapted to engage the workpiece aperture to prevent rotation of said basket member with respect to the workpiece.

9. The basket member of claim 5 wherein said relatively thin annular wall part is adapted to be deformed by being flared circumferentially uniformly into engagement with a countersunk portion of the workpiece aperture.

10. The basket member of claim 8 wherein the conical angle of said countersunk portion of the workpiece aperture is about 100° and said relatively thin annular wall part is adapted to be permanently deformed to a conical angle of at least about 100°.

11. A rivetless floating anchor nut assembly comprising a nut member having a base portion having a plane bearing surface configured to provide said nut member with a pair of identical diametrically opposed lugs and a basket member of one-piece metal construction and having a sleeve portion and a nut member engaging and retaining portion, said sleeve portion adapted to enter an aperture in a workpiece and having a deformable part adapted to be permanently deformed to affix said basket member to said workpiece and said nut member engaging and retaining portion having a bearing surface in slidable engagement with said bearing surface of said nut member and a pair of wings each having a slot therethrough adjacent said basket member bearing surface, said lugs being in said slots thus to capture the nut member with respect to said basket member, said wings being resiliently flexible to spread said slots to clear said lugs to permit removal of said nut member from said basket member, and replacement of said nut member with a new nut member an indefinite number of times, said basket member having a hardness in the range of which the lower limit is 34 on the Rockwell C scale and the upper limit is 38 on the Rockwell C scale.

12. The anchor nut assembly of claim 11 wherein the basket member is of heat treatable metal and is heat treated to a hardness in said range.

13. The anchor nut assembly of claim 12 wherein said basket member is heat treated to a uniform hardness in said range.

14. The anchor nut assembly of claim 12 wherein said metal of said basket member is C-1035 steel.

15. The anchor nut assembly of claim 12 wherein said sleeve portion has an internal cylindrical surface defining a basket member axis and intersecting the bearing surface of said basket member, a first external cylindrical surface coaxial with said internal cylindrical surface and cooperating with said internal surface to provide said sleeve portion with a relatively thin annular wall part axially spaced from the bearing surface of said basket member, a second external cylindrical surface coaxial with said internal surface and of larger diameter than said first external cylindrical surface and cooperating with said internal surface to provide said sleeve portion with a relatively thick annular wall part axially between the first external cylindrical surface and the bearing surface of said basket member, said relatively thin annular wall part providing said deformable part of said basket member.

16. The anchor nut assembly of claim 15 wherein said thin annular wall part is imperforate.

17. The anchor nut assembly of claim 15 wherein said first and second external cylindrical surfaces are joined by a frusto-conical surface intermediate the axial ends of the sleeve portion.

18. The anchor nut assembly of claim 15 wherein said second external cylindrical surface is provided with axially extending knurls adapted to engage the workpiece aperture to prevent rotation of said basket member with respect to the workpiece.

19. The anchor nut assembly of claim 15 wherein said relatively thin annular wall part is adapted to be deformed by being flared circumferentially uniformly into engagement with a countersunk portion of the workpiece aperture.

20. The anchor nut assembly of claim 18 wherein the conical angle of said countersunk portion of the workpiece aperture is about 100° and said relatively thin annular wall part is adapted to be permanently deformed to a conical angle of at least about 100°.

* * * * *